UNITED STATES PATENT OFFICE.

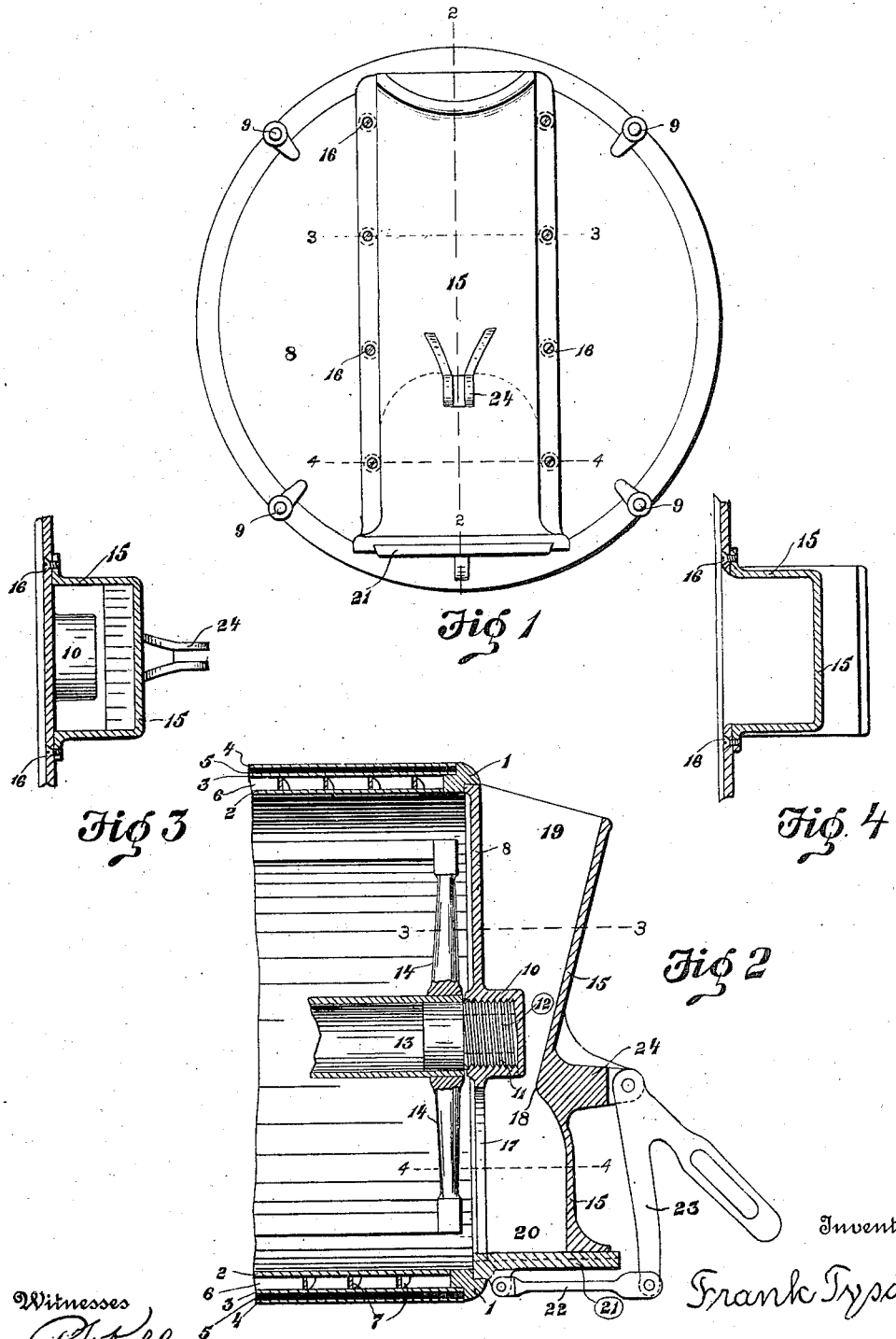

FRANK TYSON, OF CANTON, OHIO, ASSIGNOR TO THE TYSON COMPANY, OF CANTON, OHIO, A CORPORATION OF OHIO.

ICE-CREAM-FREEZER HEAD.

1,001,906.   Specification of Letters Patent.   Patented Aug. 29, 1911.

Application filed May 10, 1911. Serial No. 626,352.

*To all whom it may concern:*

Be it known that I, FRANK TYSON, a citizen of the United States, residing at Canton, in the county of Stark and State of Ohio, have invented certain new and useful Improvements in Ice-Cream-Freezer Heads, of which the following is a specification.

The invention relates to the head of an ice cream freezer of the horizontal cylinder type having rotating agitating and ejecting means therein, and the object of the improvement is to provide a combined inlet and outlet guard wall on the head by means of which the liquid cream can be introduced into and the frozen cream ejected from the freezing chamber through a single opening located in the lower portion of the head. Ice cream freezers of this type have been made with a head having an opening in the upper portion with an external guard or hopper through which the liquid cream may be fed into the freezing cylinder and into which the frozen cream can overflow and be observed by the operator, which opening has unnecessarily weakened the upper portion of the head; and furthermore difficulty has arisen from a splashing of the liquid cream through the opening and out of the hopper, caused by the proximity of the opening to the surface of the liquid cream and the rotation of the agitating and ejecting means within the freezing chamber. These difficulties are overcome by using a single opening in the lower portion of the head and providing a common guard wall, the upper portion of which is flared upward and serves as an inlet and sight hopper, while the lower portion is flared downward and serves as an outlet mouth, which mouth is provided with a valve as usually employed in machines of this type.

The invention, thus set forth in general terms, as embodied in a preferred form thereof, is illustrated in the accompanying drawing, forming part hereof, in which—

Figure 1 is a front elevation of the ice cream freezer cylinder showing the improved head thereon; Fig. 2, a vertical section of the same on line 2—2, Fig. 1; Fig. 3, a fragmentary transverse section of the head on line 3—3, Figs. 1 and 2; and Fig. 4, a fragmentary transverse section of the head on line 4—4, Figs. 1 and 2.

Similar numerals refer to similar parts throughout the drawing.

The rabbeted ring 1 forms the forward end of the horizontal cylinder of the ice cream freezer, the wall of which is made of the three concentric sheet metal tubes 2, 3 and 4 suitably spaced apart to form a space for the heat insulation packing 5 between the two outer tubes, and the annular brine chamber 6 between the two inner tubes, which chamber in turn is preferably subdivided by the spiral flanges 7 to form a spiral duct. The forward head 8 of the cylinder is composed of a circular plate which is secured in the rabbet of the ring 1 as by means of the screwed clamps 9, in the center of which plate is formed or secured the axial socket 10 adapted to receive the screw-bearing 11 for the pivot-pin 12 received in the forward end of the rotatable shaft or tube 13 to which the arms 14 of the agitating and ejecting means are secured.

The external guard wall 15 is formed or secured, as by means of the screws 16, on the forward face of the head 8, and preferably extends from the upper to the lower end thereof. The opening 17 is provided in the lower portion of the forward head 8 of the cylinder, which opening is located within the side walls of the lower portion of the guard wall 15; and the guard wall is preferably flared upward from a point 18 opposite the upper end of the opening to form the inlet and sight hopper 19, and also downward from the same point 18 to form the outlet mouth 20, although any particular flared shape for the guard wall is not essential. The mouth of the outlet is normally closed by the valve 21 which is adapted to be opened and closed by means of the connecting bar 22 and the lever 23 pivoted to the forwardly projecting bearing lug 24 formed or secured on the guard wall.

In use of the freezer, liquid cream is poured into the inlet hopper and flows downward into the freezing chamber through the opening 17 in the lower portion of the head thereof until the cylinder is filled to the desired height, which is generally about the middle or axis thereof, and it is evident that if no vent is provided the elasticity of the air in the cylinder will permit the liquid cream to rise to the middle thereof before being trapped above the opening. The freezer is then operated in the usual manner for congealing the cream, during which process the rotating means agitates the contents of the cylinder, and it is evident that the same is free to flow outward through the opening into the lower portion of the hopper, but that the location of the opening in the head below the level of the liquid cream serves to prevent any undue splashing of the same by the rotation of the agitating means. And furthermore that, when the cream has been congealed, the same may be viewed and inspected through the upper end of the hopper 19; and that, when the cream has been frozen to a sufficient degree of hardness, the valve 21 on the lower end of the hopper is readily opened by the lever 23 which permits a downward discharge of the contents of the freezing chamber through the mouth 20 and the lower end of the hopper, which discharge is effected by the rotation of the agitating and ejecting means in the usual manner.

I claim:

A horizontal-cylinder ice-cream freezer head having an opening in its lower portion, and having an external guard wall forming a hopper extending upward from the opening, said wall extending downward past the opening thus forming an outlet mouth below the opening, and a valve in the outlet mouth.

FRANK TYSON.

Witnesses:
 WM. FELLER,
 C. A. DAUGHERTY.